(12) United States Patent
Kuwahara et al.

(10) Patent No.: US 7,949,451 B2
(45) Date of Patent: May 24, 2011

(54) DRIVING FORCE CONTROL DEVICE OF VEHICLE

(75) Inventors: Seiji Kuwahara, Toyota (JP); Masato Kaigawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 925 days.

(21) Appl. No.: 11/886,002

(22) PCT Filed: Oct. 19, 2006

(86) PCT No.: PCT/JP2006/321316
§ 371 (c)(1),
(2), (4) Date: Sep. 10, 2007

(87) PCT Pub. No.: WO2007/046543
PCT Pub. Date: Apr. 26, 2007

(65) Prior Publication Data
US 2008/0140290 A1    Jun. 12, 2008

(30) Foreign Application Priority Data
Oct. 21, 2005   (JP) ................................. 2005-307379

(51) Int. Cl.
G06F 7/00    (2006.01)
(52) U.S. Cl. ................. 701/54; 701/84; 701/51; 477/54
(58) Field of Classification Search ............. 701/21, 701/54, 84; 477/37, 43, 46, 54
See application file for complete search history.

(56) References Cited

U.S. PATENT DOCUMENTS

| 6,066,070 | A | 5/2000 | Ito et al. | |
| 6,640,179 | B2* | 10/2003 | Katakura et al. | 701/54 |
| 7,303,505 | B2* | 12/2007 | Kanafani et al. | 477/46 |
| 7,606,649 | B2* | 10/2009 | Sato | 701/54 |
| 2004/0128048 | A1* | 7/2004 | Iwatuki et al. | 701/54 |
| 2005/0182544 | A1* | 8/2005 | Preisner | 701/51 |
| 2006/0011004 | A1* | 1/2006 | Sakai et al. | 74/340 |
| 2006/0030449 | A1* | 2/2006 | Tsukada et al. | 477/3 |
| 2006/0183581 | A1* | 8/2006 | Iwatsuki et al. | 474/8 |
| 2009/0037066 | A1* | 2/2009 | Kuwahara et al. | 701/84 |
| 2010/0197454 | A1* | 8/2010 | Iwatsuki et al. | 477/44 |
| 2010/0197455 | A1* | 8/2010 | Iwatsuki et al. | 477/44 |

FOREIGN PATENT DOCUMENTS

| EP | 1 188 602 A2 | 3/2002 |
| JP | A 4-171353 | 6/1992 |
| JP | A-11-105584 | 4/1999 |
| JP | A 11-280882 | 10/1999 |
| JP | A 200-289496 | 10/2000 |
| JP | A 2000-289496 | 10/2000 |
| JP | A 2002-087117 | 3/2002 |

* cited by examiner

*Primary Examiner* — Mark Hellner
*Assistant Examiner* — Helal A Algahaim
(74) *Attorney, Agent, or Firm* — Oliff & Berridge, PLC

(57) ABSTRACT

A powertrain manager executes a program including the steps of: reading an instruction gear ratio kgear(1) for transmission control; calculating an actual gear ratio kgear(2); determining that failure of an automatic transmission has occurred on a low gear side if relation of kgear(1)<{kgear(2)/α} or kgear(1)<{kgear(2)−β} is satisfied; and substituting larger one of kgear(1) and kgear(2) into a gear ratio for operation.

2 Claims, 2 Drawing Sheets

DRIVING FORCE CONTROL DEVICE OF VEHICLE

TECHNICAL FIELD

The present invention relates to a control device of a vehicle including a powertrain having an engine and an automatic transmission, and more particularly to a driving force control device capable of outputting driving force corresponding to driving force requested by a driver.

BACKGROUND ART

With regard to a vehicle including an engine and an automatic transmission capable of controlling engine output torque independently of accelerator pedal operation by a driver, there is a concept of "driving force control" that positive and negative target drive torque calculated based on a degree of pressing the accelerator pedal by a driver, a vehicle operation condition and the like is achieved as engine torque and a transmission gear ratio of the automatic transmission. Control schemes referred to as "driving force request type" and "driving force demand type" also belong to such a concept.

Japanese Patent Laying-Open No. 2002-87117 discloses a driving force control device capable of achieving driving force as requested by a driver and thereby significantly improving power performance and drivability, with such control specifications that a steady target and a transitional target of driving force are attained by tuned control of engine torque and gear ratio.

In a powertrain having an engine and a transmission, the driving force control device disclosed in this publication includes: accelerator pressing degree detection means for detecting a degree of pressing an accelerator; vehicle speed detection means for detecting a vehicle speed; target driving force operation means for operating static target driving force based on the detected degree of pressing the accelerator and vehicle speed; driving force pattern operation means for operating a pattern of variation in the target driving force; steady target value operation means for operating an engine torque steady target value based on the target driving force and operating a gear ratio steady target value based on the detected degree of pressing the accelerator and vehicle speed; transitional target value operation means for operating an engine torque transitional target value and a gear ratio transitional target value based on the pattern of variation in the target driving force; target engine torque achieving means for achieving the engine torque steady target value and the engine torque transitional target value; and target gear ratio achieving means for achieving the gear ratio steady target value and the gear ratio transitional target value.

According to the driving force control device, during running, the target driving force operation means operates the static target driving force based on the degree of pressing the accelerator detected by the accelerator pressing degree detection means and the vehicle speed detected by the vehicle speed detection means, and the driving force pattern operation means operates the pattern of variation in the target driving force. In addition, the steady target value operation means operates the engine torque steady target value based on the target driving force and operates the gear ratio steady target value based on the detected degree of pressing the accelerator and vehicle speed. The transitional target value operation means operates the engine torque transitional target value and the gear ratio transitional target value based on the pattern of variation in the target driving force. Then, the target engine torque achieving means achieves the engine torque steady target value and the engine torque transitional target value, and the target gear ratio achieving means achieves the gear ratio steady target value and the gear ratio transitional target value. Namely, control specifications are such that engine torque does not entirely compensate for generation of inertia torque involved with transmission delay of the transmission or variation in the revolution speed, but the steady target and the transitional target of driving force are achieved by tuned control of the engine torque and the gear ratio. Therefore, driving force as requested by the driver can be achieved, and power performance and drivability can significantly be improved.

In calculating the target driving force as driving force of a driveline on the drive wheel side relative to the transmission in driving force control, a gear ratio is required for operation of torque to be output from an internal combustion engine. In the driving force control device disclosed in Japanese Patent Laying-Open No. 2002-87117, an actual gear ratio calculated based on a ratio between input and output revolution speeds of the transmission is used.

If such an actual gear ratio is used, however, it is affected by fluctuation in the revolution speed or sensor accuracy, and control stability may lower. Meanwhile, it is also possible to use a gear ratio instruction value output from the control device controlling the transmission, however, deviation from the actual gear ratio may be produced in the event of failure, and in such a case, torque to be output by the internal combustion engine may not properly be calculated. In particular, if the torque to be output by the internal combustion engine is calculated by using the gear ratio instruction value while such a failure that a signal indicates a small gear ratio instruction value (2nd or 3rd on the high gear side) whereas the actual gear ratio is great (1st on the low gear side) occurs, the problem is noticeable. Here, the gear ratio is assumed as small, and torque to be output by the internal combustion engine is calculated as a great value. Consequently, relative to the torque to be output by the internal combustion engine that is calculated as a relatively large value, driving force actually output to the drive wheel side with a large actual gear ratio becomes excessively large.

DISCLOSURE OF THE INVENTION

The present invention was made to solve the above-described problems. An object of the present invention is to provide a driving force control device of a vehicle capable of achieving stable driving force control during a normal operation, free from such an event that the torque to be output by a power source is calculated as an excessively large value when an automatic transmission fails.

A driving force control device of a vehicle according to the present invention controls driving force of a vehicle including a power source and an automatic transmission connected to the power source. The control device sets target driving force generated on a drive wheel side relative to the automatic transmission, calculates output torque to be generated in the power source, based on the target driving force and a gear ratio of the automatic transmission, controls the gear ratio of the automatic transmission based on the target driving force, calculates a gear ratio based on input and output revolution speeds of the automatic transmission, and determines abnormality of the automatic transmission based on the calculated gear ratio and a gear ratio instruction value for controlling the automatic transmission based on the target driving force, In calculating the output torque, the output torque to be generated in the power source is calculated by using any of the calculated gear ratio and the gear ratio instruction value, based on a result of determination.

According to the present invention, if there is a large deviation between the gear ratio calculated based on the actual input and output revolution speeds of the automatic transmission and the gear ratio instruction value, it is determined that abnormality has occurred in the automatic transmission, because there is no such deviation during normal operation. In such a case, the control device selects one of the gear ratio calculated based on the actual input and output revolution speeds and the gear ratio instruction value depending on presence/absence of abnormality, and calculates the output torque. For example, if abnormality has occurred, a greater gear ratio is selected so that the output torque to be generated in the power source can be prevented from being calculated as an excessively large value. If abnormality has not occurred, the gear ratio instruction value is selected so that lowering in stability in driving force control due to influence of fluctuation in the revolution speed or sensor accuracy can be prevented. Consequently, a driving force control device of a vehicle capable of achieving stable driving force control during a normal operation, free from such an event that the torque to be output by the internal combustion engine is calculated as an excessively large torque when an automatic transmission fails, can be provided.

Preferably, in calculating the output torque, when determination as abnormal is made, the output torque to be generated in the power source is calculated by using a larger gear ratio out of the calculated gear ratio and the gear ratio instruction value.

According to the present invention, if abnormality has occurred, a greater gear ratio is selected so that the output torque to be generated by the power source can be prevented from being calculated as an excessively large value. Namely, even if such failure that a signal indicates a small gear ratio instruction value (the high gear side) whereas the actual gear ratio is great (the low gear side) should occur, the output torque to be generated by the power source is not calculated as an excessively large value.

Further preferably, in calculating the output torque, when determination as abnormal is not made, the output torque to be generated in the power source is calculated by using the gear ratio instruction value.

According to the present invention, if abnormality has not occurred, the transmission instruction value is selected so that lowering in stability in driving force control due to influence of fluctuation in the revolution speed or sensor accuracy can be prevented. Stable driving force control can thus be achieved.

BEST MODES FOR CARRYING OUT THE INVENTION

Figure 1:
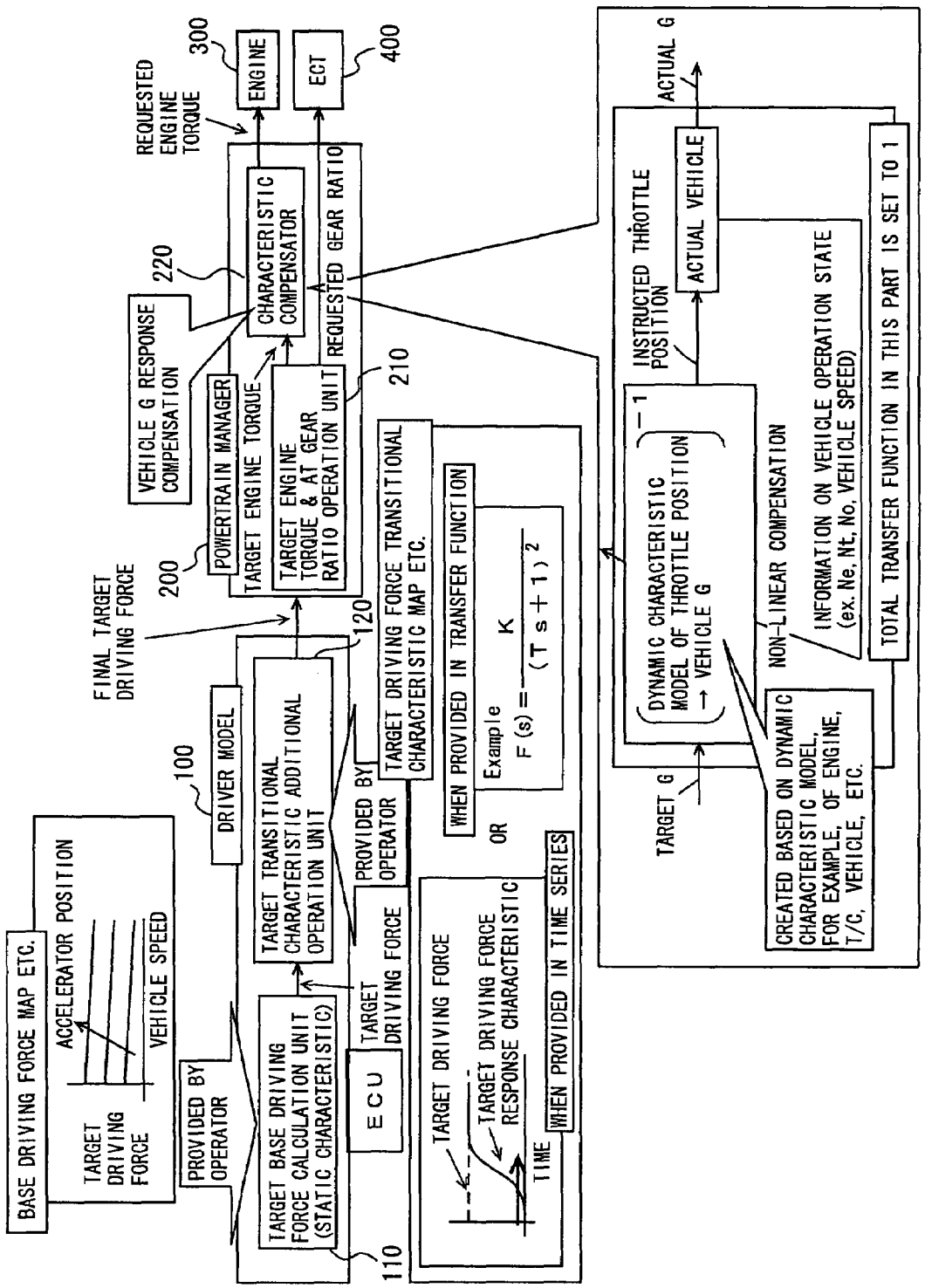
FIG. 1 is a block diagram showing an overall configuration of a control device according to an embodiment of the present invention.

An embodiment of the present invention will be described hereinafter with reference to the drawings. In the description below, the same elements have the same reference characters allotted. Their label and function are also identical. Therefore, detailed description thereof will not be repeated.

FIG. 1 shows a control block diagram of a driving force control device according to the present embodiment. The driving force control device is implemented by a program executed by a CPU (Central Processing Unit) included in an ECU (Electronic Control Unit) mounted on a vehicle.

As shown in FIG. 1, the driving force control device finally outputs requested engine torque to an engine 300 and outputs requested gear to an ECT (Electronically Controlled automatic Transmission) 400. Here, ECT 400 may be a belt CVT (Continuously Variable Transmission), and in such a case, it is a requested gear ratio not the requested gear that is output. In the description below, a gear ratio is referred to.

In the following, a configuration of the driving force control device according to the present embodiment will be described in detail with reference to FIG. 1. It is noted that types of a map, a transfer function, a coefficient, and a parameter shown below are by way of example and the present invention is not limited thereto.

The driving force control device includes a driver model 100 and a powertrain manager 200. The driving force control device carries out tuning associated with human senses other than the hardware characteristics of the vehicle, in a target transitional characteristic additional operation unit 120 included in driver model 100, and carries out tuning associated with the hardware characteristics of the vehicle other than the human senses, in a characteristic compensator 220 included in powertrain manager 200, thus distinguishing between the human senses and the hardware characteristics of the vehicle. In addition, tuning of the transitional characteristics due to non-linearity of the hardware characteristics of the vehicle is facilitated. In the following, description of the driving force control device will be given, sequentially referring to driver model 100 and powertrain manager 200.

As shown in FIG. 1, driver model 100 includes a target base driving force calculation unit (static characteristic) 10 and target transitional characteristic additional operation unit 120 calculating final target driving force based on the target driving force output from target base driving force calculation unit (static characteristic) 110.

Target base driving force calculation unit (static characteristic) 110 calculates the target driving force based on a map in which the target driving force is determined based on a vehicle speed, with an accelerator position adopted as a parameter, for example, as shown in a base driving force MAP etc. in FIG. 1. Namely, in target base driving force calculation unit (static characteristic) 110, the target driving force is calculated based on the position of the accelerator operated by the driver and the speed of the vehicle (vehicle speed) at that time.

In addition, maximum driving force that can currently be generated is set as the maximum value in target base driving force calculation unit (static characteristic) 110. The maximum driving force is calculated based on a gear ratio that can currently be set and on the engine torque characteristic.

Currently generated driving force is employed as an initial value for the target base driving force in target base driving force calculation unit (static characteristic) 110 when the accelerator is off. Specifically, as target base driving force F(pap) (pap represents an accelerator position) is calculated by using a map or a function, it is expressed as F(pap)=f(pap), and it is assumed here as F(0)=currently generated driving force. Thus, an angle of throttle is calculated from the throttle position corresponding to the currently generated driving force. Accordingly, even if deviation between the target value and the current value (the accelerator is off and the driving force is 0) becomes too large when the target base driving force during accelerator-off is not set to the currently generated driving force, excessive increase in the generated driving force at the initial stage after transition from accelerator-off to accelerator-on is suppressed and occurrence of shock can be avoided.

Target transitional characteristic additional operation unit 120 is a unit performing an operation to determine which transitional characteristic should be set, based on the human senses (apart from the hardware characteristics of the vehicle). Target transitional characteristic additional operation unit 120 gives the target driving force transitional characteristic in time series or in a transfer function F(s) (second order delay), for example, as shown with "target driving force transitional characteristic MAP etc." in FIG. 1. If target transitional characteristic additional operation unit 120 gives the target driving force transitional characteristic in time series or in the transfer function (on the premise that characteristic compensator 220 which will be described later normally operates), vehicle acceleration characteristics (static characteristic and dynamic characteristic) with respect to the accelerator position can be tuned (customized) by adjusting target response in the target driving force transitional characteristic MAP, without depending on the hardware characteristics of the vehicle. In the following, an example in which the "target driving force transitional characteristic MAP etc." is given in the transfer function will be described.

As shown in FIG. 1, target transitional characteristic additional operation unit 120 employs transfer function $F(s)=K/(Ts+1)^2$. Here, a parameter T (period) is calculated as follows.

Parameter T (period) is calculated by adding f(dF) to a T base value which is a parameter during normal operation, where dF represents a difference between the currently generated driving force and the target base driving force (reference value) when the accelerator is off. A value f(dF) (f(dF) $\geq 0$) calculated by using difference dF based on map f or function f is added to the T base value. Thus, on the premise that, as the difference (dF) between the currently generated driving force and the target base driving force is greater from the time point of accelerator-off to the time point of accelerator-on (map f and function f is set), f(dF) is greater, parameter T (period) becomes greater and gradient of increase in the driving force becomes smaller (gradual).

As described above, the transfer function shown in FIG. 1 represents an example configured with a second order factor. If it is assumed that the target driving force varies in a stepped manner (the accelerator pedal is pressed in a stepped manner), in a time domain, transient response of second order delay type is obtained based on the transfer function. In this regard, it can be said that a filter of second order delay type is provided with respect to the requested driving force.

As to a specific example of actual adjustment (tuning), a parameter $\omega n$ and a parameter $\zeta$ in the transfer function described above are tuned. By analyzing a waveform of the step response of the transfer function, the following can be found. In the description below, an example in which the expression representing the transfer function is converted from $F(s)=K/(Ts+1)^2$ to $F(s)=K \cdot \omega n/(s^2+2\zeta \omega n+\omega n^2)$ will be described.

Parameter $\zeta$ causes overshoot if relation of $0<\zeta<1$ (insufficient vibration suppression) is satisfied, and as parameter $\zeta$ is smaller, vibration is greater. If relation of $\zeta>1$ (excessive vibration suppression) is satisfied, vibration does not occur, and as parameter $\zeta$ is greater, approach to the target value is more gradual. If relation of $\zeta=1$ (critical vibration suppression) is satisfied, vibration does not occur and convergence to the target value is achieved.

As to an overshoot Φ when relation of $0<\zeta<1$ (insufficient vibration suppression) is satisfied, the following can be seen. If vibration suppression is insufficient, vibration repeating overshoot and undershoot occurs. Therefore, it is impossible to actually set parameter $\zeta$ within a range of $0<\zeta<1$ (insufficient vibration suppression). Accordingly, parameter $\zeta$ is tuned based on the principles as follows.

If mild change in acceleration is requested by the driver or tuning adapted to family car is requested in view of a concept of the vehicle, parameter $\zeta$ (>1) is adjusted to increase. Namely, gradual rise represented as $\zeta=2.0$ or $\zeta=4.0$ is attained.

On the other hand, if directly felt change in acceleration is requested by the driver or tuning adapted to sports car is requested in view of a concept of the vehicle, parameter $\zeta$ is adjusted to a value as close as 1 and greater than 1. Namely, parameter $\zeta$ is adjusted to a value close to 1, with $\zeta=1.0$ being the limit. As shown with a case where $\zeta=1.0$, quick rise can be attained.

Tuning of parameter $\omega n$ will now be described. Parameter $\omega n$ affects the shape of a response curve until the point of inflection is reached in the step response of the second delay type. If parameter $\omega n$ is increased with parameter $\zeta$ set to 1, the shape of the response curve described above soon becomes linear, and if parameter $\omega n$ is made smaller, the response curve gradually becomes linear (in a rounding manner). Here, parameter $\omega n$ is tuned based on the principles as follows.

If mild change in acceleration is requested by the driver or tuning adapted to family car is requested in view of a concept of the vehicle, parameter $\omega n$ is adjusted to become smaller. Namely, gradual rise as rounding in the vicinity of the point of inflection is attained.

On the other hand, if directly felt change in acceleration is requested by the driver or tuning adapted to sports car is requested in view of a concept of the vehicle, parameter $\omega n$ is adjusted to increase. Namely, quick rise without rounding in the vicinity of the point of inflection is attained.

If mild change in acceleration is requested by the driver or tuning adapted to family car is requested in view of a concept of the vehicle in this manner, parameter $\zeta$ (>1) and parameter $\omega n$ are adjusted to become greater and smaller, respectively. If directly felt change in acceleration is requested by the driver or tuning adapted to sports car is requested in view of a concept of the vehicle, parameter $\zeta$ (>1) is adjusted to a value as close as 1 and parameter $\omega n$ is adjusted to increase. These parameters and the method of adjusting the parameters are by way of example, and the present invention is not limited thereto.

As described above, when the target driving force transitional characteristic is given in the transfer function as shown in FIG. 1, an operator can easily realize tuning for readily matching the senses of the driver or the concept of the vehicle. Thus, the compensator for the hardware characteristics (particularly, non-linear characteristics) of the vehicle is configured with characteristic compensator 220 of powertrain manager 200 which will be described later, and solely factors affecting the human senses but not affecting such hardware characteristics of the vehicle can be adjusted in driver model 100, separately from the hardware characteristics of the vehicle.

Powertrain manager 200 includes a target engine torque & AT gear ratio operation unit 210 and characteristic compensator 220 calculating requested engine torque based on the target engine torque output from target engine torque & AT gear ratio operation unit 210. Characteristic compensator 220 compensates for a part dependent on the hardware characteristics of the vehicle, of the response of vehicle G represented by acceleration generated in the vehicle.

Here, the target engine torque is calculated by multiplying final target driving force input from driver model 100 to powertrain manager 200 by an AT gear ratio. Accordingly, a gear ratio of the automatic transmission is required. In the control device according to the present embodiment, the gear ratio is calculated such that 1) stability of driving force control during normal operation is ensured and 2) engine torque in the event of failure is prevented from being calculated as an excessively large value. Detailed description will be given later in connection with a flowchart.

Characteristic compensator 220 is a component optional in the present invention, and designed based on an inverse function of the transfer function from engine throttle position to vehicle acceleration which is found by identifying an actual vehicle or detailed simulation model as to a part of the hardware characteristics of the vehicle, in particular a part having strong non-linearity, apart from the human senses. According to such a configuration, an accelerator position-vehicle acceleration characteristic (static characteristic, dynamic characteristic) can be maintained constant, without much affected by the hardware characteristics of the vehicle. Thus, together with target transitional characteristic additional operation unit 120 described above, the characteristic compensator can always provide an acceleration characteristic achieving high satisfaction to a user.

The requested gear ratio output from target engine torque & AT gear ratio operation unit 210 is input to ECT 400, so that an oil-hydraulic circuit of the transmission is controlled and the requested gear ratio is formed in the transmission.

In addition, as shown in FIG. 1, characteristic compensator 220 is designed such that total transfer function G(s) from target G (target engine torque) to actual G (requested engine torque) (including the inverse function of the dynamic characteristic model of throttle position→vehicle G) satisfies the relation of "G(s)=1". Thus, even in a high-frequency domain (if the accelerator position is suddenly changed), excellent response can be maintained. It is noted that the dynamic characteristic model of throttle position→vehicle G is created based on the dynamic characteristic model of the engine, a torque converter, and the vehicle.

As to the total transfer function G(s), a drive region is divided into a plurality of regions and each region is partially linearized or the like, so that the inverse function of the dynamic characteristic model of throttle position→vehicle G may be calculated. Alternatively, characteristic compensator 220 may vary or switch between the characteristics based on information on a vehicle operation state (engine speed Ne, turbine speed Nt, output shaft speed No, vehicle speed). Thus, such an effect as changing the dynamic characteristic model itself can be obtained.

As shown in FIG. 1, target transitional characteristic additional operation unit 120 is provided forward of powertrain manager 200, and powertrain manager 200 is provided as a functional block separate from target transitional characteristic additional operation unit 120. Target transitional characteristic additional operation unit 120 is configured as a functional block processing solely a part relevant to human senses, while powertrain manager 200 is configured as a functional block processing solely a part dependent on the hardware characteristics of the vehicle.

Figure 2:
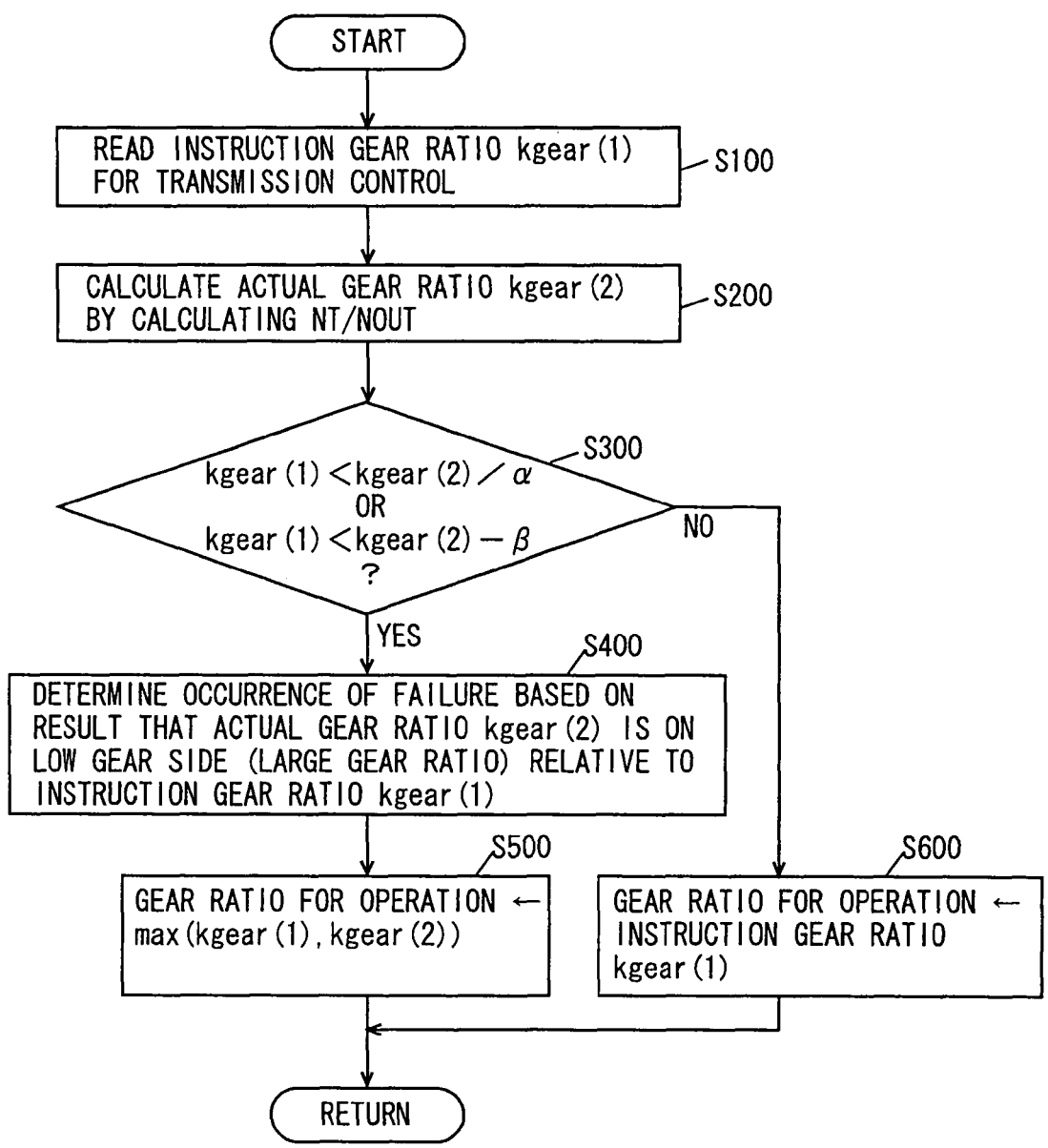
FIG. 2 is a flowchart showing a control structure of a program executed in a powertrain manager of an engine system in FIG. 1.

A control structure of a program for processing calculation of a gear ratio for operation, executed in target engine torque & AT gear ratio operation unit 210 of powertrain manager 200, will be described with reference to FIG. 2.

In step (hereinafter, step is denoted as S) 100, target engine torque & AT gear ratio operation unit 210 reads an instruction gear ratio kgear(1) for transmission control. This gear ratio corresponds to the requested gear ratio indicated by a signal output from target engine torque & AT gear ratio operation unit 210 to ECT 400.

In S200, target engine torque & AT gear ratio operation unit 210 calculates an actual gear ratio kgear(2) by dividing a turbine speed NT representing the input shaft speed of the transmission by an output shaft speed NOUT.

In S300, target engine torque & AT gear ratio operation unit 210 determines whether relation of kgear(1)<{kgear(2)/α} (at least α is greater than 1) or relation of kgear(1)<{kgear(2)−β} (at least β is greater than 0) is satisfied. If relation of kgear(1)<{kgear(2)/α} or relation of kgear(1)<{kgear(2)−β} is satisfied (YES in S300), the process proceeds to S400. Otherwise (NO in S300), the process proceeds to S600. It is noted that α and β are set with sufficient margin such that failure is reliably sensed. If failure has not occurred, basically (unless sensor accuracy is sufficiently taken into account), relation of kgear(1)=kgear(2) is satisfied.

In S400, target engine torque & AT gear ratio operation unit 210 determines that failure has occurred in which actual gear ratio kgear(2) is on the low gear (large gear ratio) side relative to instruction gear ratio kgear(1). For example, such failure that instruction gear ratio kgear(1) is small (2nd or 3rd on the high gear side) whereas actual gear ratio kgear(2) is large (1st on the low gear side) has occurred.

In S500, target engine torque & AT gear ratio operation unit 210 substitutes max{kgear(1), kgear(2)} into the gear ratio for operation. The function max selects any larger value. In S600, target engine torque & AT gear ratio operation unit 210 substitutes kgear(1) into the gear ratio for operation.

An operation for calculating the gear ratio for operation in the driving force control device based on the structure and the flowchart as above will be described.

While the vehicle for which driving force control is carried out is running, instruction gear ratio kgear(1) for transmission control is read (S100), and actual gear ratio kgear(2) is calculated (S200).

[Case where Automatic Transmission is Normal]

Here, instruction gear ratio kgear(1) for transmission control is substantially equal to actual gear ratio kgear(2). Therefore, none of relation of kgear(1)<{kgear(2)/α} and relation of kgear(1)<{kgear(2)−β} is satisfied (NO in S300).

Accordingly, instruction gear ratio kgear(1) obviating the need to consider influence of fluctuation in the input shaft speed or the output shaft speed of the automatic transmission or influence of accuracy of the sensor sensing the revolution speed is substituted into the gear ratio for operation (S600).

Consequently, as the gear ratio for operation used for operation for calculating the engine torque is not affected by fluctuation in the revolution speed or sensor accuracy, lowering in stability in controlling driving force can be avoided.

[Case where Automatic Transmission is not Normal]

In this case, instruction gear ratio kgear(1) for transmission control is not equal to actual gear ratio kgear(2), and there is a large deviation therebetween. Therefore, relation of kgear(1)<{kgear(2)/α} or relation of kgear(1)<{kgear(2)−β} is satisfied (YES in S300). Here, occurrence of failure is assumed, where actual gear ratio kgear(2) is on the low gear (large gear ratio) side relative to instruction gear ratio kgear(1). Accordingly, any larger one of instruction gear ratio kgear(1) obviating the need to consider influence of fluctuation in the input shaft speed or the output shaft speed of the automatic transmission or influence of accuracy of the sensor sensing the revolution speed and actual gear ratio kgear(2) that can be guarded by the actual gear ratio even in the event of failure is substituted into the gear ratio for operation (S500).

Consequently, during normal operation, a larger gear ratio out of instruction gear ratio kgear(1) and actual gear ratio kgear(2) is selected as the gear ratio for operation used for operation for calculating the engine torque, and in the event of failure, actual gear ratio kgear(2) is selected. As a result, selection of a smaller gear ratio as the gear ratio for operation is avoided, and even if failure should occur, engine torque is prevented from being calculated as an excessively large value and driving force is also prevented from becoming excessively large.

As described above, the driving force control device according to the present embodiment is configured such that the functional block (target transitional characteristic additional operation unit) affecting the human senses or the senses relevant to the concept of the vehicle and the functional block (characteristic compensator) affecting the hardware characteristics of the vehicle are separately implemented. According to the target transitional characteristic additional operation unit, an operator can readily tune the transfer function from the target driving force to the final target driving force based on the senses; for example, the target transitional characteristic is represented in the transfer function of second order delay. Thus, the transitional characteristic in a time domain such as rise characteristic after the accelerator pedal is pressed in a stepped manner is readily adjusted. In addition, according to the characteristic compensator, the total transfer function G(s) including the inverse function of the dynamic characteristic model from the throttle position to vehicle G is defined as G(s)=1, so that non-linearity is excluded and the requested engine torque can be calculated based on the target engine torque. Consequently, the operator can readily carry out tuning associated with the human senses and the hardware characteristics can be compensated for, regardless of the hardware characteristics of the vehicle having non-linear control characteristic.

In addition, in the target base driving force calculation unit, the maximum driving force that can currently be generated is employed as the maximum value of the target base driving force. Thus, when the accelerator is fully pressed, setting of the throttle position target, calculated based on the driving force target, to wide open can be compensated for.

Moreover, an AT gear ratio necessary for calculating the requested engine torque based on the final target driving force can properly be selected, taking into consideration failure of the automatic transmission. Consequently, the requested engine torque is prevented from being calculated as an excessively large value in the event of failure of the automatic transmission, and stable driving force control without being affected by fluctuation in the revolution speed or accuracy in the revolution speed sensor can be attained during normal operation.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A driving force control device of a vehicle including a power source and an automatic transmission connected to said power source;
said control device
setting target driving force generated on a drive wheel side relative to said automatic transmission,
calculating output torque to be generated in said power source, based on said target driving force and a gear ratio of said automatic transmission,
controlling said gear ratio of said automatic transmission based on said target driving force,
calculating a gear ratio based on input and output revolution speeds of said automatic transmission,
determining abnormality of said automatic transmission, based on said calculated gear ratio and a gear ratio instruction value for controlling said automatic transmission based on said target driving force,
in calculating said output torque, calculating the output torque to be generated in said power source by using any of said calculated gear ratio and said gear ratio instruction value, based on a result of determination, and
in calculating said output torque, when determination as abnormal is made, the output torque to be generated in said power source is calculated by using a larger gear ratio out of said calculated gear ratio and said gear ratio instruction value.

2. A driving force control device of a vehicle including a power source and an automatic transmission connected to said power source, comprising;
target driving force setting means for setting target driving force generated on a drive wheel side relative to said automatic transmission,
torque calculation means for calculating output torque to be generated in said power source, based on said target driving force and a gear ratio of said automatic transmission,
gear ratio control means for controlling said gear ratio of said automatic transmission based on said target driving force,
gear ratio calculation means for calculating a gear ratio based on input and output revolution speeds of said automatic transmission, and
abnormality determination means for determining abnormality of said automatic transmission, based on said gear ratio calculated by said gear ratio calculation means and a gear ratio instruction value output from said gear ratio control means,
said torque calculation means includes means for calculating output torque to be generated in said power source by using any of said gear ratio calculated by said gear ratio calculation means and said gear ratio instruction value output from said gear ratio control means, based on a result of determination by said abnormality determination means, and
said torque calculation means includes means for calculating the output torque to be generated in said power source by using a larger gear ratio out of said gear ratio calculated by said gear ratio calculation means and said gear ratio instruction value output from said gear ratio control means, when determination as abnormal is made by said abnormality determination means.

* * * * *